Figure 1:
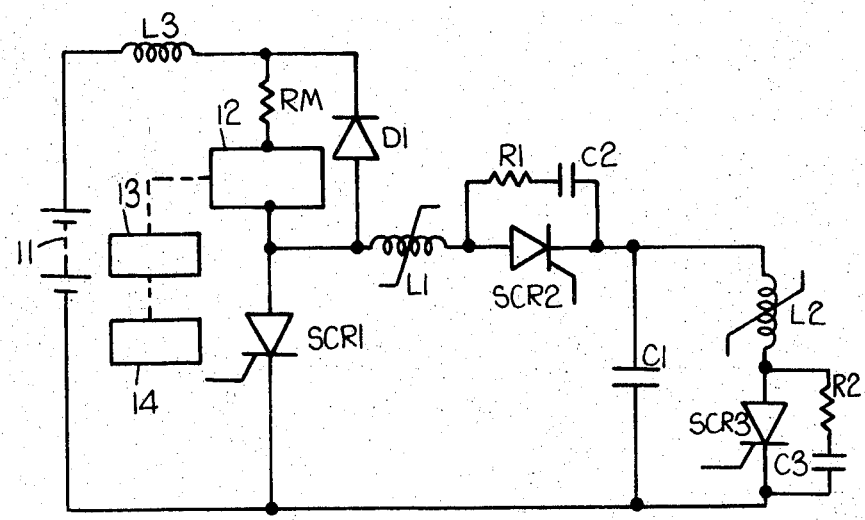

United States Patent [19]

Thompson et al.

[11] 3,841,238

[45] Oct. 15, 1974

[54] VEHICLE TRACTION SYSTEMS

[75] Inventors: Michael Ainley Thompson, Hasbury; Brian Leslie Phillips, Hollywood, both of England

[73] Assignee: Joseph Lucas (Industries) Limited, Birmingham, England

[22] Filed: Jan. 26, 1972

[21] Appl. No.: 220,925

[30] Foreign Application Priority Data

Jan. 26, 1971   Great Britain...................... 3153/71

[52] U.S. Cl.................. 180/65, 318/331, 318/341, 318/345
[51] Int. Cl. ............................................. H02p 5/16
[58] Field of Search ...... 180/65; 318/139, 331, 327, 318/341, 345, 356

[56] References Cited
UNITED STATES PATENTS

| | | | |
|---|---|---|---|
| 3,064,174 | 11/1962 | Dinger............................... | 318/345 |
| 3,127,550 | 3/1964 | Gilbreath........................... | 318/345 |
| 3,222,585 | 12/1965 | Lobb.................................. | 318/345 |
| 3,241,023 | 3/1966 | Eby.................................... | 318/345 |
| 3,428,881 | 2/1969 | Cote................................... | 318/345 |
| 3,466,522 | 9/1969 | Cushing............................. | 318/345 |
| 3,486,102 | 12/1969 | Wilkerson.......................... | 318/345 |
| 3,488,571 | 1/1970 | Tomaki.............................. | 318/345 |
| 3,597,671 | 8/1971 | Adams................................ | 318/341 |
| 3,599,064 | 8/1971 | Friedman........................... | 318/331 |
| 3,619,753 | 11/1971 | Thompson......................... | 318/345 |

Primary Examiner—Robert S. Ward, Jr.
Assistant Examiner—Reinhard J. Eisenzopf
Attorney, Agent, or Firm—Holman & Stern

[57] ABSTRACT

A vehicle traction system has a drive motor with the shunt field winding and a control circuit for the drive motor. A control circuit effects direct variation in the armature current with the current in the field winding fixed until it becomes impossible to increase the armature current directly. Control is then effected by varying the field winding current.

16 Claims, 6 Drawing Figures

VEHICLE TRACTION SYSTEMS

This invention relates to vehicle traction systems, particularly but not exclusively for road vehicles.

In one apsect, the invention resides in a vehicle traction system including a drive motor having a shunt field winding, and a control circuit for the drive motor, said control circuit serving to effect direct variation in the armature current, with the current in the field winding fixed, until it becomes impossible to increase the armature current directly, at which point the current in the field winding is reduced to enable the required control to be effected.

In another aspect, the invention resides in a vehicle traction system comprising a drive motor having a shunt field winding, a field current control circuit for maintaining current flow in said field winding, and an armature current control circuit for effecting direct variation of the armature current under the control of a function generator, which, for a given setting of the accelerator pedal of the vehicle, determines the required armature current necessary to achieve a predetermined performance of the vehicle, the system further including field control means operable automatically when the back e.m.f. developed in the armature prevents further increase in armature current for overriding said field current control circuit and lowering the field current.

In one arrangement, the field current control circuit maintains current flow in said field winding.

In another arrangement the field current is varied in a predetermined manner by the field current control circuit. For example, it can be fixed but reduced for light accelerator pedal settings.

Figure 2:
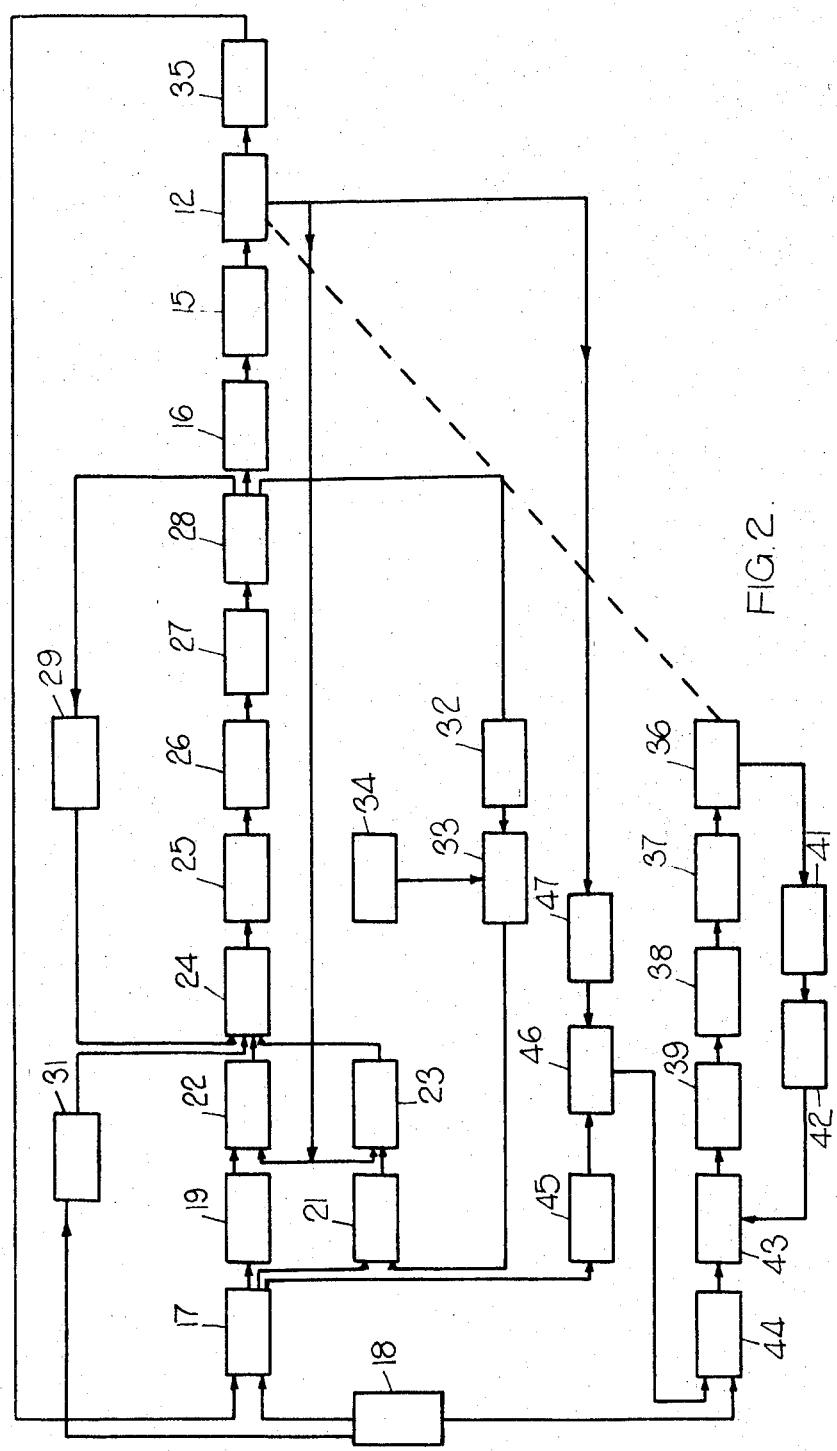

An example of the invention is illustrated in the accompanying drawings, in which FIG. 1 is a circuit diagram, FIG. 2 is a block diagram of the overall system of which FIG. 1 forms a part, and FIGS. 3 to 6 respectively are circuit diagrams of other portions of the circuit.

Referring to FIG. 1, the vehicle incorporates a battery 11 and a drive motor having an armature 12 and a resistor Rm in series with the armature 12 the purpose of the resistor Rm being described below. The motor also incorporates a shunt field winding which is not shown in FIG. 1, and the motor serves through a gear box 13 to drive the wheels 14 of the road vehicle.

The positive terminal of the battery 11 is connected through an inductor L3 and the resistor Rm and armature 12 in series to the anode of the thyristor SCR1, the cathode of which is connected to the negative battery terminal. The armature 12 and resistor Rm are bridged by a re-circulating diode D1, and the junction of the armature 12 and thyristor SCR1 is connected to the negative battery terminal through a choke L1, the anode-cathode path of a thyristor SCR2 and a capacitor C1 in series. The thyristor SCR2 has its anode-cathode path bridged by a resistor R1 in series with a capacitor C2, and the capacitor C1 is bridged by a choke L2 in series with the anode-cathode of a thyristor SCR3, the thyristor SCR3 itself being bridged by a resistor R2 and a capacitor C3 in series.

The circuit shown in FIG. 1 controls the means current flow in the armature 12 in the following manner. Assume for convenience that the thyristor SCR2 is conducting and the thyristors SCR1 and SCR3 are off. Current flows from the battery by way of the inductor L3, armature 12, choke L1 and thyristor SCR2 to charge the capacitor C1 to a voltage which, by virtue of the inductance in the charging circuit, will be in excess of battery voltage. When the capacitor C1 has charged, the thyristor SCR2 will turn off, because there is no further current flow through it. At a later stage in the cycle, thyristor SCR1 is fired to establish the main flow of motor current through the armature 12 and the thyristor SCR1 in series. At the same time as thyristor SCR1 is fired, thyristor SCR3 is fired, causing the capacitor C1 to reverse its charge by way of the choke L2 and the thyristor SCR3. When the charge on the capacitor C1 has reversed, the thyristor SCR3 turns off because there is no further current flow through it. Later in the cycle, the thyristor SCR2 is fired, and the capacitor C1 now reverse biases the thyristor SCR1 to turn off the thyristor SCR1. It will be appreciated that the mean current flow in the armature 12 depends on the instants of firing of the thyristors SCR1 and SCR2. The moment at which the thyristor SCR3 is fired is not important, as long as the charge on the capacitor C1 is reversed before the thyristor SCR2 fires again, and for this reason it is convenient always to fire the thyristor SCR3 at the same time as the thyristor SCR1.

The way in which the overall system is designed is as follows. The precise physical features of the vehicle are first determined, including the shape and weight of the vehicle, so that all the forces acting upon the vehicle will be known. The designer then specifies a performance which he requires from the vehicle, and knowing the required performance and all the fixed parameters of the vehicle, it is possible to plot a graph showing the required power at the wheels for a given speed of the vehicle. Knowing the power required at the wheels, the motor can be designed so that it always provides sufficient power under the worst possible conditions. A control system for the motor can then be designed incorporating a function generator which, for a given setting of the accelerator pedal of the vehicle, determines the required armature current necessary to deliver the required power at the wheels, and so achieve the desired performance. Since the motor drives the wheels through a fixed ratio reduction gear box, the control system can achieve the required effect by varying the armature current of the motor in a predetermined manner. This can be achieved by using the circuit of FIG. 1 by direct variation of the armature current, the field current being constant. However, there will inevitably come a time when, by virtue of the e.m.f. developed in the armature windings, direct control of the armature current is no longer possible, and in these circumstances the field current is then varied to effect the required control. Although the exact way in which the control is effected will be described in detail, it will be of assistance to note at this point that in FIG. 1, if the control system demands an armature current of a given level, the function generator operates by setting two levels, one just above the required level and one just below the required level. When the armature current rises to the upper level, thyristor SCR2 is fired to turn off the thyristor SCR1. When the armature current falls to the lower level, thyristor SCR1 is fired again.

Referring now to the block diagram shown in FIG. 2, the armature 12 is illustrated in block form, and the current flowing through it is controlled by a thyristor power controller 15 which is of course the arrangement shown in FIG. 1. The controller 15 is in turn controlled by a thyristor firing circuit 16 which applies the firing pulses to the three thyristors in FIG. 1. The function generator referred to previously is shown at 17, and is coupled to the accelerator pedal 18, although for the moment it will be assumed for convenience that the accelerator pedal is fully depressed, so that the maximum available power is demanded. The generator 17 has inputs to the set upper level block 19 and the set lower level block 21. These blocks set the currents as explained, so that if for example the generator 17 demands a current of 60 amps, the block 19 sets an upper level of 65 amps and the block 21 sets a lower level of 55 amps. The actual current flowing is determined by upper level and lower level detectors 22, 23, and the blocks 19, 21, 22, 23 together control the thyristor firing circuit 16 through the intermediary of the various refinements indicated as a logic unit 24, a Schmitt bistable 25, a minimum off time circuit 26, a minimum on time circuit 27 and finally an output stage 28 driving the circuit 16. The output stage 28 is also coupled to a cycling oscillator 29 providing another input to the logic unit 24, and an inhibit circuit 31 provides a fourth input to the logic unit 24, the inhibit circuit 31 being coupled to the accelerator pedal 18. The output stage 28 also provides a signal by way of frequency to voltage converter 32 to a comparator 33 which also receives a voltage from a reference source 34, the output from the comparator 33 controlling the lower level block 21 in a manner to be described. Moreover, a road speed tachometer 35 is provided which provides an input to the function generator 17.

In order to clarify the operation of this portion of the block diagram, the basic operation will again be related to FIG. 1, ignoring the refinements, and the refinements will then be explained. The funciton generator 17 receives a signal from the tachometer 35, so that the speed of the vehicle is known. Still assuming that the accelerator pedal is fully depressed, the generator 17 now sets a current which is required in the armature of the motor to give the requird power at the wheels to achieve the pre-set performance of the vehicle. The output signal from the function generator 17 is converted to upper and lower current levels by the blocks 19 and 21 and the associated detector blocks 22 and 23, which receive an input from the armature 12, control the logic unit 24 which operates on the output stage 28 and the firing circuit 16 to fire the thyristors SCR1 and SCR2 in FIG. 1 to give the required armature current. It is assumed at this stage that the required armature current can be achieved by direct variation of the armature current using the circuit of FIG. 1, the field current being fixed.

There are a number of circumstances under which the basic operation must be modified, and these will now be explained, Reverting to FIG. 1, it is essential for the capacitor C1 to be charged to ensure that the thyristor SCR1 turns off when thyristor SCR2 is fired. For this reason, when the vehicle is started, the thyristor SCR2 must be the first to be fired in order to ensure that the capacitor C1 charges. The inhibit circuit 31 acts on the logic unit 2 to make sure that this happens.

It is possible under certain conditions that the on period of the thyristor SCR1 in FIG. 1, or its off period, could fall to such values that the various processes which must take place in FIG. 1 do not have time to do so. Thus, with the thyristor SCR1 off, the firing pulse to turn it on again must be delayed for at least long enough for the capacitor C1 to charge. With the thyristor SCR1 on, the firing pulse for turning it off again must be delayed at least sufficiently long for the charge on the capacitor C1 to be reversed. The purpose of the minimum off and minimum on circuits 26 and 27 is to set minimum periods, so that the circuit of FIG. 1 will operate satisfactorily.

In FIG. 1, the back e.m.f. of the armature increases with motor speed and so the rate of rise of armature current is reduced by the back e.m.f., assuming the field current to be fixed. Under certain load conditions, it is possible for the current flowing through the armature to reach a level which is substantially constant but which is less than the current demanded by the function generator 17. Under these circumstances, as will be described, the field current is vaired. and so the armature current should reach the demanded level. However, if the demanded level is not reached for any reason, then the thyristor SCR1 will remain on indefinitely, which is undesirable because over a long period of time the charge on the capacitor C1 will leak away, so that when eventually conditions change and the thyristor SCR2 is fired to turn the thyristor SCR1 off, the capacitor C1 will fail to do so. The cycling oscillator 29 is designed to prevent this possibility by feeding to the unit 24 a signal simulating the effect of the upper current requirement having been reached, even though it has not in fact been reached, so that the thyristor SCR2 is fired to turn off the thyristor SCR1, after which the armature current falls to the lower level, whereupon the thyristor SCR1 is fired again.

The purpose of the converter 32 and its associated comparator 33 and reference source 34 is to restrict the switching frequency to a maximum value such that the thyristors in FIG. 1 will operate satisfactorily. It will be appreciated that thyristors take a finite time to turn on and off, and if the circuit is operating at an extremely high frequency, the arrangement of FIG. 1 can become unreliable. The converter 32 produces a d.c. signal proportional to frequency, and this is compared with a reference signal, so that if a predetermined frequency is exceeded, the comparator 33 lowers the lower current level demanded by the block 21, so that the frequency automatically becomes reduced.

The portion of the block diagram so far described acts to effect a direct variation of the armature current using the circuit shown in FIG. 1. The field of the motor is indicated in block form at 36, and the field current is determined by a controller 37 which in turn is controlled by an output stage 38 the input of which is received from an oscillator 39. The field current is measured by an integrating amplifier 41 and associated inverter 42, the output from the inverter 42 being fed to a comparator 43 which also receives an input from a field current setting circuit 44, the comparator 43 providing an output to the oscillator 39.

The function generator 17 provides an input to a circuit 45 which indicates to a further comparator 46 the armature current which is demanded by the function generator 17. The comparator 46 also receives a signal from the armature 12 by way of an integrating amplifier 47, and provided that the demanded armature current is being provided by direct control using the circuit of FIG. 1, then the inputs to the comparator 46 will be the same, and so the comparator 46 provides no output to the circuit 44. In these circumstances, the field current is kept constant at a value determined by the circuit 44. However, when the back e.m.f. reaches a level at which direct armature current control becomes impossible, then the circuit to the comparator 46 by way of the amplifier 47 will be smaller than the input from the circuit 45, and the comparator 46 then acts on the circuit 44 to change the field current, so that the required control is achieved. It will be noted that the circuit 44 is shown coupled to the accelerator pedal 18. Although normally speaking the field current will be constant provided that direct armature current control is being satisfactorily achieved, this arrangement can be wasteful of power when the accelerator pedal is only partly depressed. For this reason, the fixed level of the field current can be reduced for light pedal settings, in order to save power.

Figure 3:
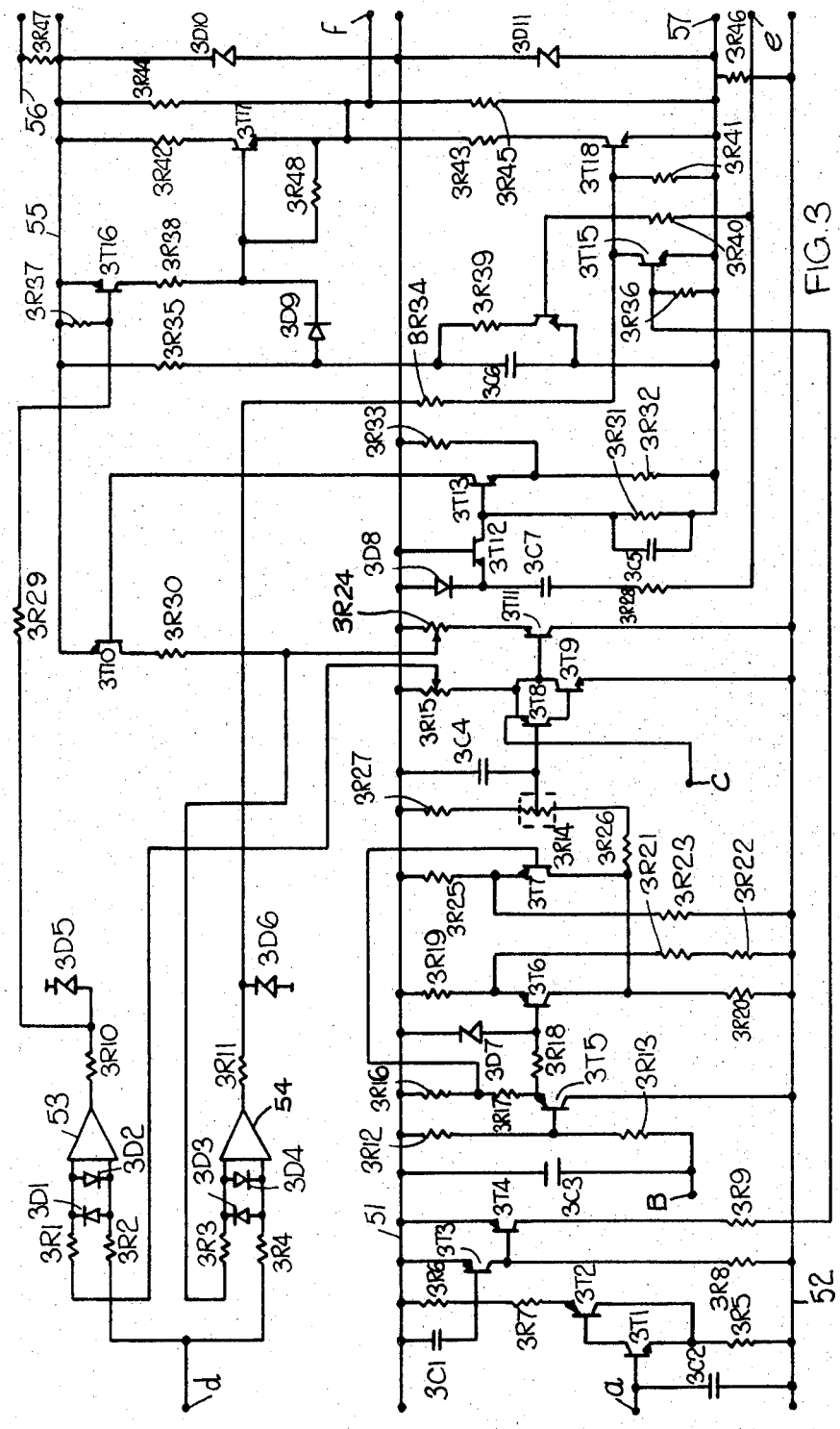

In order to understand the operation of the various blocks, the circuit will now be described in detail. It will be noted that in the circuit diagrams, the same references are used for different components, but with a suffix indicating the number of the drawing, so that capacitor 3C1 is the capacitor C1 appearing in FIG. 3. Referring to FIG. 3, there are provided supply lines 51 and 52 derived from the battery and having potentials respectively of zero and minus 20 volts. The circuit includes an n-p-n transistor 3T1 having its base connected to a terminal a which is coupled to a corresponding terminal a in FIG. 5, the base further being connected through a capacitor 3C2 to the line 52. The collector of the transistor 3T1 is connected to the base of a p-n-p transistor 3T2, the emitter of which is connected to the line 51 through resistors 3R7 and 3R6 in series, the resistor 3R6 being bridged by a capacitor 3C1. The collector of the transistor 3T2 is connected to the emitter of the transistor 3T1, which is connected to the line 52 through a resistor 3R5.

The junction of resistors 3R6 and 3R7 is connected to the base of a p-n-p transistor 3T3, the emitter of which is connected to the line 51 and the collector of which is connected through a resistor 3R8 to the line 52, and is also connected to the base of a p-n-p transistor 3T4, the emitter of which is connected to the line 51. The output from this part of the circuit is taken from the collector of the transistor 3T4 through a resistor 3R9 to the base of a transistor 3T15.

The circuit further includes a terminal B which receives a signal from the tachometer 35 shown in FIG. 2. The terminal b is connected to the line 51 through parallel circuits one of which contains a capacitor 3C3 and the other of which contains resistors 3R13 and 3R12 in series, the junction of the resistors 3R13 and 3R12 being connected to the base of p-n-p transistor 3T5 having its collector connected to the line 52 and its emitter connected through resistors 3R17 and 3R16 in series to the line 51. The emitter of the transistor 3T5 is further connected through a resistor 3R18 and a Zener diode 3D7 in series to the line 51, the junction of the resistor 3R18 and Zener diode 3D7 being coupled to the base of a p-n-p transistor 3T6, the emitter of which is connected to the line 51 through a resistor 3R19, and to the line 52 through resistors 3R21 and 3R22 in series, and the collector of which is connected to the line 52 through a resistor 3R20. The collector of the transistor 3T6 is further connected to the line 51 through a series circuit including a resistor 3R26, an accelerator potentiometer 3R14 and a resistor 3R27, and is further connected to the collector of a p-n-p transistor 3T7, the emitter of which is connected to the line 52 through a resistor 3R23, and to the line 51 through a resistor 3R25, and the base of which is connected to the junction of the resistors 3R16 and 3R17.

Figure 5:
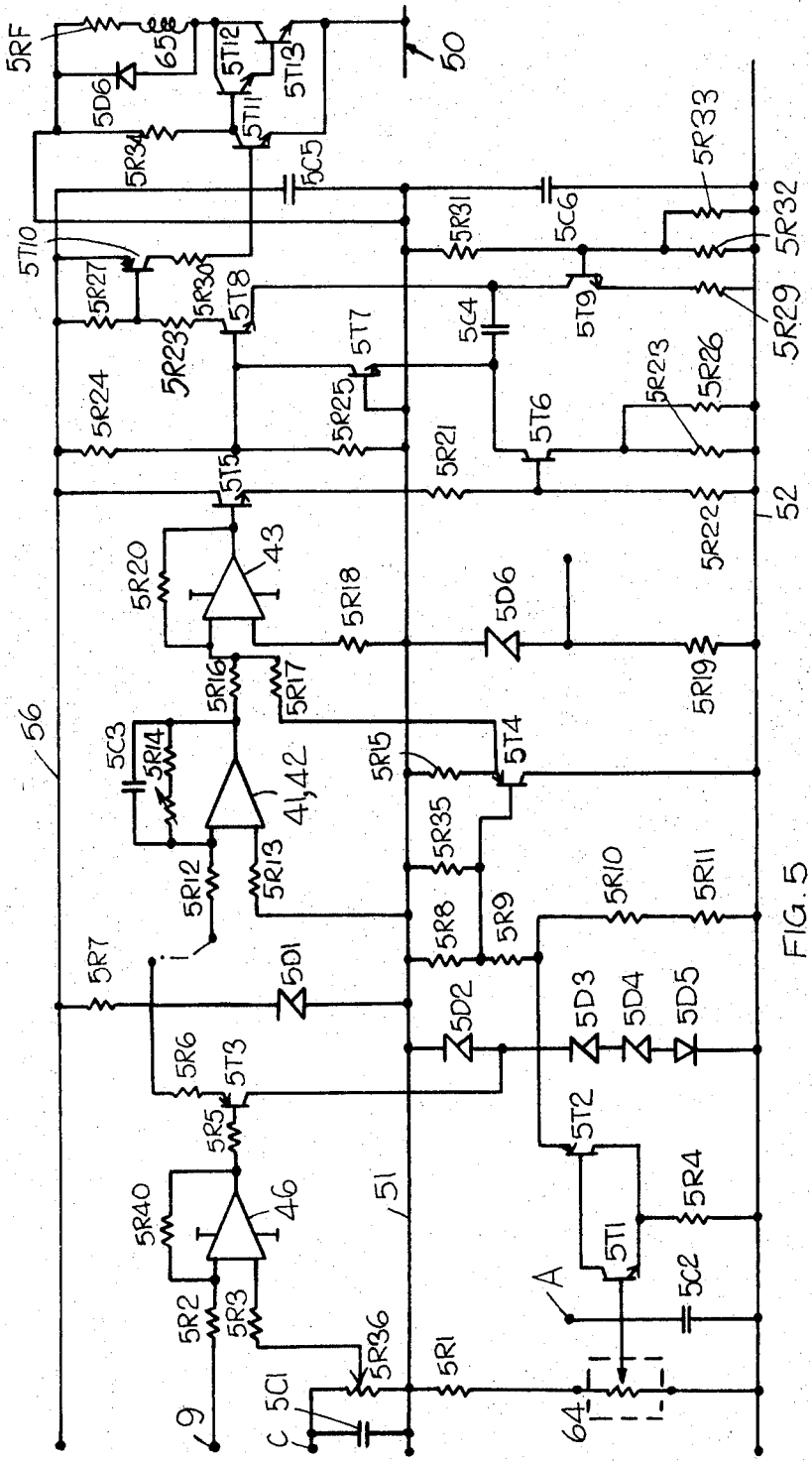

A variable point on the potentiometer 3R14 is connected through a capacitor 3C4 to the line 51, and is further connected to the base of a p-n-p transistor 3T8, the emitter of which is connected to a terminal c which is coupled to a corresponding terminal c in FIG. 5. The emitter of the transistor 3T8 is connected through a resistor 3R15 to the line 51, and is further connected to the collector of an n-p-n transistor 3T9 and to the base of a p-n-p transistor 3T11. The transistor 3T9 has its base connected to the collector of the transistor 3T8 and its emitter connected to the line 52, whilst the transistor 3T11 has its emitter connected to the line 51 through a resistor 3R24 and its collector connected to the line 52.

A pre-set point on the resistor 3R15 is connected through a resistor 3R1 to one input terminal of a bi-stable circuit 53. A pre-set point on the resistor 3R24 is connected through a resistor 3R3 to one input terminal of another bi-stable circuit 54, both bistable circuts 53 and 54 being constituted by operational amplifiers operated between a plus 15 volt and a minus 15 volt rail. The circuits 53 and 54 each receive further inputs through resistors 3R2 and 3R4 respectively from a terminal d which is connected to a terminal d in FIG. 4, and which receives an input proportional to armature current. The input terminals of the circuits 53 and 54 are each bridged by a pair of oppositely connected diodes which protect the circuits, the diodes being shown at 3D1 and 3D2 for the circuit 53, and at 3D3 and 3D4 for the circuit 54. The output from the circuit 53 is fed by way of resistors 3R10 and 3R29 in series to the base of a p-n-p transistor 3T16, the junction of the resistors 3R10 and 3R29 being connected to a plus 15 volt supply through a Zener diode 3D5. The output from the circuit 54 is fed through resistors 3R11 and 3R34 in series to the base of a n-p-n transistor 3T18, the junction of the resistors 3R11 and 3R34 being connected to a minus 15 volt supply through a Zener diode 3D6. The emitter of the tansistor 3T16 is connected to a plus 15 volt supply rail 55 which is fed from a plus 20 volt supply 56 through a resistor 3R47. The base of the transistor 3T16 is connected to the supply line 55 through a resistor 3R37, whilst its collector is connected through a resistor 3R38 and a diode 3D9 in series to the junction of a resistor 3R35 and a capacitor 3C6 connected in series between the line 55 and a minus 15 volt supply line 57. Connected across the capacitor 3C6 in series are a resistor 3R39 and a collector-emitter path of an n-p-n transistor 3T14, the base of which is connected through a resistor 3R40 to a terminal e which is connected to a corresponding terminal E in FIG. 4. The terminal e is also connected through a resistor 3R28 a capacitor 3C7 and a diode 3D8 in series to the line 51, the junction of the diode 3D8 and capacitor 3C7 being connected to the emitter of a p-n-p transistor 3T12, the base of which is connected to the line 51 and the collector of which is connected to the line 57 through a resistor 3R31 bridged by a capacitor 3C5, and is further connected to the base of a p-n-p transistor 3T13 the emitter of which is connected to the lines 51, 57 through resistors 3R33 and 3R32 respectively, and the collector of which is connected to the base of an p-n-p transistor 3T10 having its emitter connected to the line 55 and its collector connected through a resistor 3R30 to the pre-set point on the resistor 3R24.

The junction of the resistor 3R38 and diode 3D9 is also connected to the base of an n-p-n transistor 3T17 the base and emitter of which are interconnected through a resistor 3R48, the collector of which is connected to a resistor 3R42 to the line 55, and the emitter of which is connected through a resistor 3R43 to the collector of the transistor 3T18, the emitter of which is connected to the line 57. The transistor 3T18 has its base connected to the line 57 through parallel circuits one of which contains a resistor 3R41 and the other of which contains a collector-emitter path of the n-p-n transistor 3T15, the emitter of which is connected to the line 57, the base of which is connected to the line 57 through a resistor 3R36, and the base of which is further connected, as previously described, through the resistor 3R9 to the collector of the transistor 3T4. the emitter of the transistor 3T17 is further connected to the junction of a pair of resistors 3R44 and 3R45 connected between the lines 55, 57 this junction being further connected to an output terminal $f$ coupled to a corresponding terminal $f$ in FIG. 4. Finally in FIG. 3, a Zener diode 3D10 is connected between the line 51 and the line 55, and a further Zener diode 3D11 is connected between the line 51 and the line 57. The lines 52, 57 are interconnected through a resistor 3R46.

Figure 4:
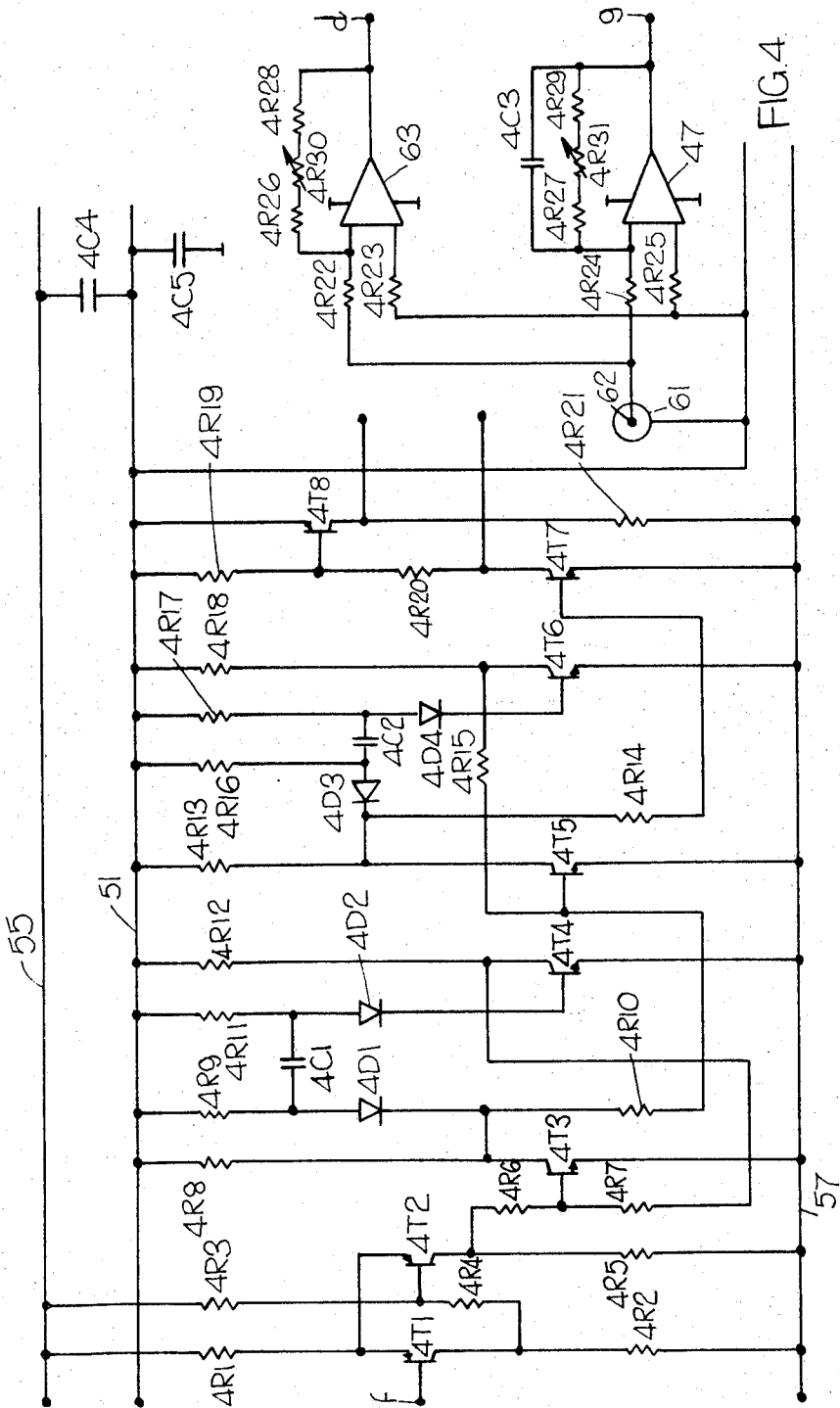

Referring now to FIG. 4, it will be seen that the lines 51, 55 and 57 are common to this circuit also, and that the lines 51, 55 are interconnected through a capacitor 4C4, whilst the line 51 is connected to the minus 15 volts supply line 57 through a capacitor 4C5. The terminals $d$, $e$, $b$ appear in FIG. 4 and as previously described are connected to the corresponding terminals in FIG. 3, and in addition there is a terminal $g$ which is connected to a corresponding terminal $g$ in FIG. 5, and a terminal $h$ connected to a corresponding terminal $h$ in FIG. 6.

The terminal $f$ is connected to the base of a p-n-p transistor 4T1, the collector of which is connected to the line 57 through a resistor 4R2, and is further connected to resistors 4R4, 4R3 in series to the line 55. The junction of the resistors 4R3 and 4R4 is connected to the base of another p-n-p transistor 4T2 the emitters of the transistors 4T1, 4T2 being connected through a resistor 4R1 to the line 55, and the collector of the transistor 4T2 being connected to the line 57 through resistor 4R5. The collector of the transistor 4T2 is further connected through a resistor 4R6 to the base of an n-p-n transistor 4T3, the emitter of which is connected to the line 57 and the collector of which is connected through a resistor 4R8 to the line 51. The base of the transistor 4T3 is connected through a resistor 4R7 to the collector of an n-p-n transistor 4T4, the emitter of which is connected to the line 57 and the base of which is connected to the line 51 through a diode 4D2 and a resistor 4R11 in series. The junction of the resistor 4R11 and the diode 4D2 is connected through a capacitor 4C1 to the junctin of resistor 4R9 and a diode 4D1 which are connected in series between the line 51 and the collector of the transistor 4T3, and the collector of the transistor 4T3 is further connected through a resistor 4R10 to the base of an n-p-n transistor 4T5 having its emitter connected to the line 57 and its collector connected through a resistor 4R13 to the line 51. The collector of the transistor 4T5 is further connected through a diode 4D3, a capacitor $c$ and a diode 4D4 in series to thr base of an n-p-n transistor 4T6, the emitter of which is connected to the line 57 and the collector of which is connected through a resistor 4R15 to the base of the transistor 4T5. The junction of the diode 4D3 and capacitor 4C2 is connected through a resistor 4R16 to the line 51, and the junction of the capacitor 4C2 and the diode 4D4 is connected through a resistor 4R17 to the line 51. The transistor 4T6 has its collector connected to the line 51 through a resistor 4R18, and the collector of the transistor 4T5 is connected through a resistor 4R14 to the base of an n-p-n transistor 4T7, the emitter of which is connected to the line 57 and the collector of which is connected to the terminal $h$, and is further connected through resistors 4R20 and 4R19 in series to the line 51. The junction of the resistors 4R19 and 4R20 is connected to the base of a p-n-p transistor 4T8 having its emitter connected to the line 51, and its collector connected to the terminal E and, through a resistor 4R21 to the line 57.

The circuit further includes a pair of conductors 61, 62 which are constituted respectively by the outer and inner of a co-axial cable, this cable being connected across the resistor Rm in FIG. 1 so as to sense the armature current of the motor. The conductor 61 is connected to the line 51, and the conductor 62 is connected through resistors 4R22 and 4R24 respectively to an amplifier 63 and to an integrating amplifier 47. The amplifier 47 is seen in the block diagram, ant the amplifier 63 is not actually shown in the block diagram but is positioned between the traction motor armature 12 and the detectors 22 and 23. Both amplifiers are constituted by operational amplifiers receiving inputs from a plus 15 and minus 15 volt supply, and further inputs are fed to the amplifiers 63 and 47 from the line 51 by way of resistors 4R23 and 4R25 respectively. The output from the amplifier 63 is fed to the terminal D and the output from the integrating amplifier 47 is fed to the terminal $g$. It will be seen that the amplifier 63 has resistors 4R26, 4R30 and 4R28 associated therewith, whilst the amplifier 47 has resistors 4R27, 4R31 and 4R29, together with a capacitor 4C3 associated therewith so that if forms an integrating function.

Referring now to FIG. 5, it will be seen that the supply lines 51, 52 and 56 again appear. Moreover, terminals $c$ and $g$ are shown and as previously explained are connected to the corresponding terminals $c$ and $g$ in FIG. 3 and FIG. 4 respectively. The lines 56, 51 are bridged by a resistor 5R7 and a Zener diode 5D1 in series, the junction between the resistor 5R7 and the Zener diode 5D1 providing a plus 15 volt supply for the various operational amplifiers utilised in the circuit. The lines 51 and 52 are bridged by a Zener diode 5D6 and a resistor 5R19 in series, the junction of the resistor 5R19 and Zener diode 5D6 providing a minus 15 volt supply for the operational amplifiers.

The terminal $c$ is connected to the line 51 through a capacitor 5C1 and a resistor 5R36 in parallel, and a pre-set point on the resistor 5R36 is connected through a resistor 5R3 to one input terminal of an operational amplifier which is bridged by a resistor 5R34 so that it acts as the comparator 46 in the block diagram. The other input to the comparator 46 is from the terminal $g$ by way of a resistor 5R2, and the output from the comparator 46 is fed through a resistor 5R5 to the base of a p-n-p transistor 5T3, the emitter of which is connected to a resistor 5R6 to the junction of the resistor 5R7 and Zener diode 5D1, and the collector of which is connected through a Zener diode 5D2 to the line 51 and through Zener diodes 5D3, 5d4 and a diode 5D5 in series to the line 52.

The circuit further includes an operational amplifier having connected across it parallel circuits one of which contains a variable resistor 5R37 and a fixed resistor 5R17 in series, and the other of which contains a capacitor 5C3, so that the operational amplifier acts as a combined integrating amplifier and inverter, and in fact constitutes the parts 41, 42 seen in the block diagram. One input to the device 41, 42 is taken through a resistor 5R13 from the line 51, and the other input is fed by way of a resistor 5R12 from a terminal $i$ which is connected to one end of a resistor 5Rf in series with the field winding, so as to sense the current flow in the field winding. The other end of the resistor in series with the field winding is connected to the line 51. The output from the device 41, 42 is fed through a resistor 5R16 to one input of an operational amplifier which has a resistor 5R20 connected across it and constitutes the comparator 43 in the block diagram. The other input terminal of the comparator 43 is connected to the line 51 through a resistor 5R18, but a further input is fed to the comparator 43 by way of a resistor 5R17 from the emitter of a p-n-p transistor 5T4, the collector of which is connectd to the line 52 and the emitter of which is connected to the line 51 through a resistor 5R15. The base of the transistor 5T4 is connected through resistors 5R53 and 5R8 in parallel to the line 51, and is further connected through resistors 5R9, 5R10 and 5R11 in series to the line 52. The junction or resistors 5R9 and 5R10 is connected to the emitter of a p-n-p transistor 5T2, the collector of which is connected through a resistor 5R4 to the line 52 and the base of which is connected to the collector of an n-p-n transistor 5T1, the emitter of which is connected to the line 52 through the resistor 5R4 and the base of which is connected to the line 52 through a capacitor 5C2 and is also connected to a slider movable by the accelerator pedal of the vehicle over a fixed resistor 64 one end of which is connected to the line 52 and the other end of which is connected through a resistor 5R1 to the line 51. The base of transistor 5T1 is also connected to terminal $a$.

The output from the comparator 43 is fed to the base of an n-p-n transistor 5T5 the collector of which is connected to the line 56 and the emitter of which is connected through a resistor 5R21 and the resistor 5R22 in series to the line 52, the junction of the resistors 5R21 and 5R22 being connected to the base of an n-p-n transistor 5T6, the emitter of which is connected to the line 52 through resistors 5R23 and 5R26 in parallel. The collector of the transistor 5T6 is connected to the emitter of an n-p-n transistor 5T7 having its base connected to the line 51 and its collector connected to the junction of a pair of resistors 5R24 and 5R25 between the lines 56, 51 and further connected to the base of an n-p-n transistor 5T8 the emitter of which is connected through a capacitor 5C4 to the collector of the transistor 5T6, and is further connected to the collector of an n-p-n transistor 5T9, the emitter of which is connected to the line 52 through a resistor 5R29, and the base of which is connected to the line 51 through a resistor 5R31, and to the line 52 through resistors 5R32 and 5R33 in parallel. The collector of the transistor 5T8 is connected to the line 56 through a pair of resistors 5R28 and 5R27, the junction between which is connected to the base of a p-n-p transistor 5T10, the emitter of which is connected to the line 56, and the collector of which is connected through a resistor 5R30 to the base of an n-p-n transistor 5T11 having its collector connected through a resistor 5R34 to the line 51, and also connected to the base of an n-p-n tansistor 5T12, the emitter of which is connected to the base of an n-p-n transistor 5T13. The emitters of the transistors 5T11 and 5T13 are connected to a supply line 50 at − 180 volts and the collectors of the transistors 5T12 and 5T13 are connected to the line 51 through the field winding 65 and series field current measuring resistor 5RF, which are bridged by a diode 5D6. Finally in FIG. 5, the lines 56 and 51 are bridged by a capacitor 5C5, and the lines 52 and 51 are bridged by a capacitor 5C6.

Figure 6:
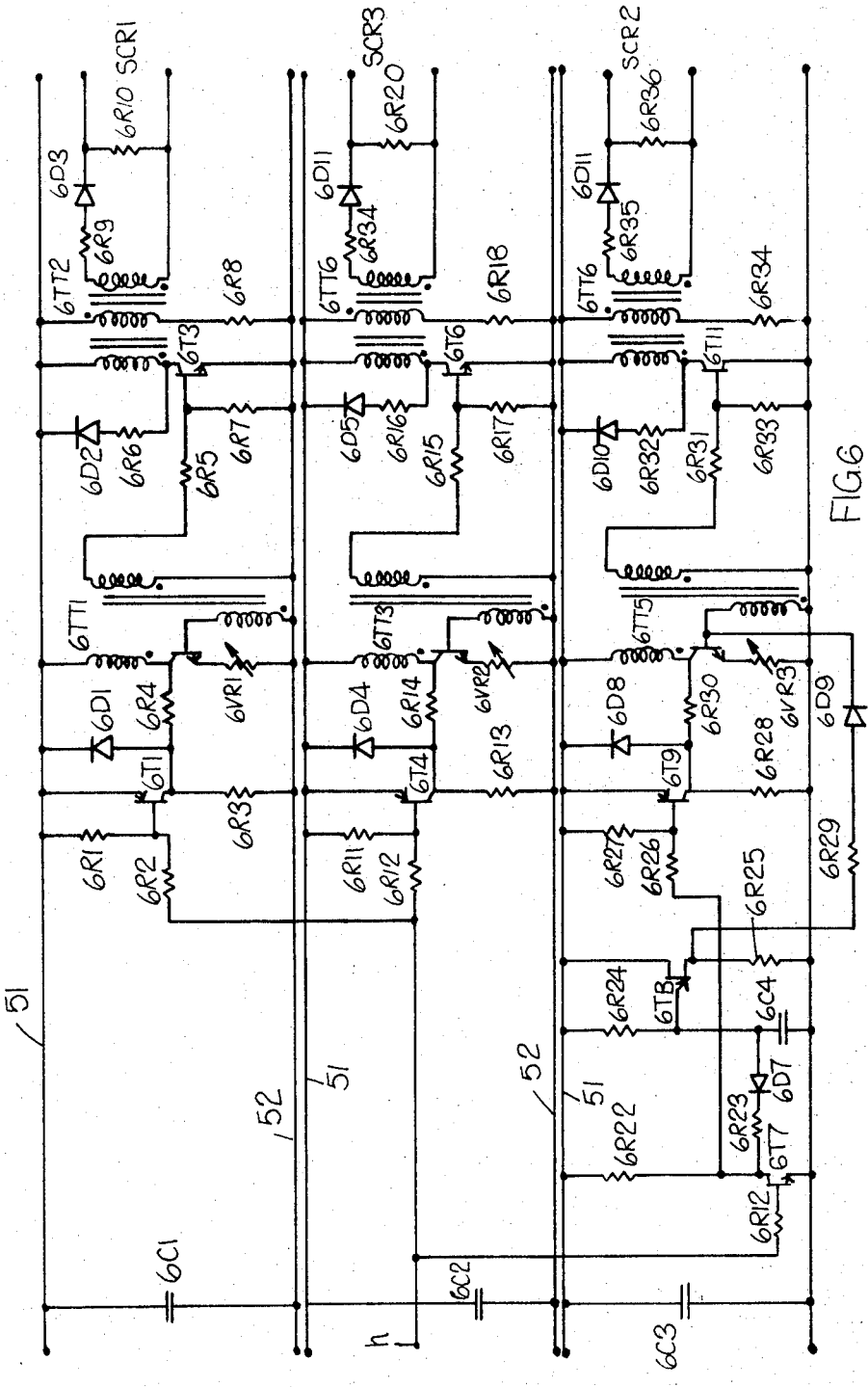

Referring now to FIG. 6, this part of the circuit is effectively 3 channels each powered by the lines 51, 52 the three channels controlling respectively the firing pulses on thyristors SCR1, SCR3 and SCR2 in FIG. 1. The lines 51, 52 in the three channels are bridged respectively by capacitors 6C1 6C2 and 6C3. The terminal $h$ is connected through a resistor 6R2 and a resistor 6R1 in series to the line 51, the junction of the resistors 6R1, 6R2 being connected to the base of a p-n-p transistor 6T1 having its emitter connected to the line 51 and its collector connected through a resistor 6R3 to the line 52, and further connected through a diode 6D1 to the line 51 and through a resistor 6R4 to the collector of an n-p-n transistor 6T2 having its emitter connected to the line 52 through a variable resistor 6VR1, and its collector and base connected to the lines 51 and 52 respective through a pari of windings of a transformer 6TT1, the output winding of which has one end connected to the line 52 and its other end connected through a resistor 6R5 and a resistor 6R7 in series to the line 52. The junction of the resistors 6R5 and 6R7 is connected to the base of an n-p-n transistor 6T3 having its emitter connected to the line 52 and its collector connected to the line 51 through a winding of an output transformer 6TT2, the collector of the transistor 6T3 being further connected to the line 51 through a resistor 6R6 and a diode 6D2 in series. The transformer 6TT2 includes a further winding with one end connected to the line 51 and its other end connected to the line 52 through a resistor 6R8, and an output winding one end of which is connected to the cathode of the thyristor SCR1 and the other end of which is connected to the gate of the thyristor SCR1 through a resistor 6R9 and a diode 6D3 in series, the gate and cathode of the thyristor SCR1 being bridged by a resistor 6R10.

The channel associated with the thyristor SCR3 is identical to the one associated with the thyristor SCR1, and it will be remembered that both these thyristors are fired simultaneously. In FIG. 6, resistors 6R11 to 6R20 correspond to resistors 6R1 to 6R10, transistors 6T4 to 6T6 correspond to transistors 6T1 to 6T3, diodes 6D4 to 6D6 correspond to diodes 6D1 to 6D3, the variable resistor 6VR2 corresponds to the variable resistor 6VR1, and the transformers 6TT3 and 6TT4 correspond to the transformers 6TT1 and 6TT2, respectively.

The terminal $n$ is also connected through a resistor 6R21 to the base of an n-p-n transistor 6T7, the emitter of which is connected to the line 52 and the collector of which is connected through a resistor 6R22 to the line 51, and is further connected through a resistor 6R26 and a resistor 6R27 in series to the line 51. The junction of resistors 6R26 and 6R27 is connected to the base of a p-n-p transistor 6T9 having its emitter connected to the line 51 and its collector connected to the line 52 through a resistor 6R28, and further connected through a diode 6D8 to the line 51 and through a resistor 6R30 to the collector of an n-p-n transistor 6T10 having its emitter connected to the line 52 through a variable resistor 6VR3. The collector and base of the transistor 6T10 are connected through a pair of windings of a transformer 6TT5 to the lines 51 and 52 respectively, the transformer 6TT5 having an output winding with one end connected to the line 52 and its other end connected through resistors 6R31 and 6R33 in series to the line 52, the junction of the resistors 6R31 and 6R33 being connected to the base of an n-p-n transistor 6T11, the emitter of which is connected to the line 52 and the collector of which is connected to the line 51 through a winding of a transformer 6TT6. The collector of the transistor 6T11 is also connected to the line 51 through a resistor 6R32 and a diode 6D10 in series, and the transformer 6TT6 further includes a second winding with one end connected to the line 51 and its other end connected to the line 52 through a resistor 6R34, and an output winding one end of which is connected to the cathode of the thyristor SCR2 and the other end of which is connected to the gate of the thyristor SCR2 through a resistor 6R35 and a diode 6D11 in series, the gate and cathode of the thyristor SCR2 being bridged by a resistor 6R36.

The collector of the transistor 6T7 is further connected through a resistor 6R23 and diode 6D7 in series to the junction of a resistor 6R24 and a capacitor 6C4 connected in series between the lines 51, 52. The junction is further connected to the gate of a uni-junction transistor, the second emitter of which is connected to the line 51 and the 1st emitter of which is connected to the line 52 through a resistor 6R25, and is further connected to the line 52 through a resistor 6R29, a diode 6D9 and the winding in the base circuit of the transistor 6T10.

In order to understand the detailed operation of the circuit, a reference will again be made to the block diagram, and the various parts corresponding to the blocks will be identified in the circuits. Considering first the function generator 17, in one particular example the following characteristic is required of armature current. When the motor starts, then until the vehicle reaches a first speed, the motor armature current is to remain constant, it still being assumed at this stage that the throttle pedal is completely depressed. Between a first vehicle speed and a second vehicle speed the motor current is to decrease from its first constant value to a second value, and then remain at this second value until a third vehicle speed is reached, whereafter the armature current is to decrease again. Referring to FIG. 3, then assuming that the speed of the vehicle is zero, there is no input to the terminal B and so the transistors 3T5 and 3T6 are off. With the throttle pedal fully depressed, the slider on resistor 3R14 is at the lower end of its potentiometer, and current flows through resistors 3R20 and 3R26 to turn on transistor 3T8 which turns on transistor 3T9 which turns on transistor 3T11. The output from the function generator is taken from the collectors of transistors 3T9 and 3T11 in a manner to be described, but for the moment it can be assumed that the current flowing in the transistor 3T8 is the current which is set by the function generator. For the moment, then, this current will have a constant value determined by the resistors 3R20 and 3R26. As the speed of the vehicle increases, a signal will appear at terminal $b$, tending to turn on transistor 3T5. However, transistor 3T6 has its emitter potential set by the resistors 3R19, 3R21 and 3R22 and does not conduct until a first vehicle speed is reached. As long as transistor 3T6 is not conducting, the conduction of transistor 3T8 remains the same. However, at the first vehicle speed, transistor 3T6 turns on, and removes part of the current flowing through resistor 3R20, decreasing the conduction of transistor 3T8. With increasing speed, transistor 3T6 conducts more heavily, so reducing the conduction of transistor 3T8 linearly, until a point is reached at which the Zener diode 3D7 breaks down, whereafter the conduction of the transistor 3T6 is held constant. Conduction of the transistor 3T8 now remains constant at a lower level than the first level, as required by the motor or vehicle characteristics. At a third vehicle speed, the transistor 3T7, the emitter potential of which is set by the resistors 3R25 and 3R23, has its base potential raised by the increasing conduction of the transistor 3T5 to a level at which the transistor 3T7 can conduct. The transistor 3T7 then removes more of the current flowing through the resistor 3R20 so that conduction of the transistor 3T8 is decreased in a linear fashion, again as required by the motor or the vehicle characteristics. Obviously other functions could be obtained in any convenient manner.

Throughout the description thus far, the accelerator pedal has been assumed to be fully depressed. If the pedal is not fully depressed, then the slider will not be at the bottom of resistor 3R14. Assuming that the pedal is depressed half-way, then the slider may be in the position shown, and it will be seen that when the vehicle speed is zero, the transistor 3T8 will still conduct a constant current until transistor 3T6 starts to conduct, but this constant current will be less than the constant current when the accelerator pedal is fully depressed. The same reasoning applies throughout the operation of the function generator, so that for any intermediate position of the accelerator pedal, the same shaped function is still produced, but at lower armature current levels.

It will be noted that the transistor 3T8 provides an output to the terminal $c$ which effectively constitutes the block 45 in FIG. 2. This point will be explained later, but referring to the block diagram still, it will be seen that the function generator 17 is to produce outputs to the blocks 19 and 21, which it will be remembered have the function of setting, for a given demand of armature current, an upper value of armature current at which the thyristor SCR2 will be fired, and a lower value of armature current at which the thyristor SCR1 will be fired. The upper value is taken from the resistor 3R15 and fed to the bi-stable circuit 53, and the lower value is taken from the resistor 3R24 and fed to the bi-stable circuit 54. The circuit 53 effectively constitutes both blocks 19 and 22, and similarly the circuit 54 constitutes both blocks 21 and 23. For this reason, there must be an input from the armature 12 itself, and it will be seen that the circuits 53 and 54 are in fact connected to the terminal d, which corresponds to the terminal d in FIG. 4. A signal is received from the resistor in series with the armature by way of the co-axial cable 61, 62, and is amplified by the amplifier 63 and fed by way of the terminal d to the bi-stable circuits 53 and 54. Thus, the bi-stable 53 receives one signal representing the armature current, and another signal representing the upper level of current in the armature. The bi-stable circuit 54 receives one signal representing armature current and another signal representing the lower level of current required in the armature, the upper and lower level currents being dictated by the function generator.

The blocks 22 and 23, which are now equivalent to the circuits 53 and 54, provide inputs to the logic unit 24 in the block diagram, and the logic unit in FIG. 3 is represented essentially by the transistors 3T16, 3T17, and 3T18, together with their associated components. Assuming that the armature current is rising, then when the upper level is reached, the circuit 53 changes state, turning on the transistor 3T16, which turns on the transistor 3T17, which raises the potential of terminal $f$, towards the positive line 55. The raising of the potential of terminal $f$ towards the positive line will in due course cause the thyristor SCR2 to be fired, whereupon the armature current will reduce. When the armture current reduces to the lower level, the bi-stable circuit 54 will change state, turning on the transistor T18. By this time the bi-stable circuit 53 will have reverted to its first state, so the transistors 3T16 and 3T17 are off, and so turning on of transistor 3T18 lowers the potential of terminal $f$ towards the negative supply line. This action causes the thyristor SCR1 to be fired, and the armature current rises again, causing the bi-stable circuit 54 to revert to its first state, and in due course causing the bi-stable circuit 53 to switch, turning on transistors 3T16 and 3T17, and continuing with the cycle. Thus, in the absence of any input signals to the logic unit 24 from either the inhibit circuit 31 or the cycling oscillator 29, terminal $f$ will move its potential alternately towards the positive line 55 and the negative line 57.

Referring now to FIG. 4, the signal at the terminal F is applied to the Schmitt trigger circuit constituted by transistors 4T1 and 4T2, and so the output from the transistor 4T2 is a square wave output the leading edge of which coincides with the upper current level being reached and the trailing edge of which corresponds with the lower current level being reached. When the transistor 4T2 turns on, it supplies base current to the transistor 4T3, which conducts to remove base current from the transistor 4T5, so allowing base current to flow through resistors 4R13 and 4R14 to the transistor 4T7, which conducts to produce an output at the terminal H. Similarly, when the transistor 4T2 turns off, the transistor 4T7 turns off. In other words, the signal at the terminal $h$ is a square wave signal corresponding in its timing to the signal at the terminal $f$, provided that the minimum off circuit and the minimum on circuit do not operate. Ignoring the minimum on and off circuits for the moment, and referring to the terminal $h$ in FIG. 6, the effect of the square wave signal is as follows. The leading edge of the signal, corresponding to the upper limit being reached, turns on the transistor 6T7, which in turn switches on the transistor 6T9, and causes the single shot blocking oscillator constituted by the transformer 6TT5 and its associated components to operate.

The uni-junction transistor 6T8 and its associated components can be ignored for the moment. Operation of the blocking oscillator provides a pulse to the thyristor SCR2 by way of the transformer 6TT6, and so the thyristor SCR2 turns on, switching off the main thyristor SCR1.

When the lower current level is reached, the trailing edge of the square wave signal at terminal $h$ turns on the transistors 6T1 and 6T4, and the single shot blocking oscillators incorporating respectively the transformers 6TT1 and 6TT3 operate to produce outputs in the output windings of the transformers 6TT2 and 6TT4 to turn on the thyristors SCR1 and SCR3.

Reverting now to FIG. 4, it is necessary to consider the operation of the minimum on circuit and the minimum off circuit indicated in the block diagram. When the transistor 4T2 turns on, the transistor 4T7 turns on as well, as previously explained, and it is desired to ensure that the transistor 4T7 stays on for the minimum period, even if the transistor 4T2 turns off again. When the transistor 4T2 turns on, the transistor 4T3 turns on as well, and connects the left-hand plate of the capacitor 4C1 to the negative rail, so that the capacitor 4C1 turns off the previously conducting transistor 4T4, and holds the transistor 4T4 off for a period of time during which the capacitor 4C1 charges. If the transistor 4T2 turns off during this period, the transistor 4T3 will be held on by current flowing through the resistor 4R12 and the resistor 4R7, so holding the transistor 4T7 on as well. As soon as the capacitor 4C1 has re-charged, the transistor 4T4 starts to conduct again, and the transistor 4T3 turns off, turning off the transistor 4T7.

When the transistor 4T2 turns off, the transistor 4T7 turns off as well, and it is necessary to ensure that the transistor 4T7 remains off, even if the transistor 4T2 turns on again, for a minimum period of time. When the transistor 4T2 turns off, the transistor 4T3 turns off and the transistor 4T5 turns on, causing the capacitor 4C2 to turn off the previously conducting transistor 4T6, and to hold the transistor 4T6 off until the capacitor 4C2 has re-charged. If the transistor 4T2 turns on during the period when the capacitor 4C2 is re-charging, the transistor 4T5 will still be held on by current flowing through the resistors 4R18 and 4R15 in series, and so will keep the transistor 4T7 off until the transistor 4T6 turns on again.

Considering now the operation of the inhibit circuit, reference is directed to FIG. 3, where the terminal $a$ receives a signal from the accelerator pedal, and controls the conduction of the transistors 3T1, 3T2, 3T3 and 3T4. Until the throttle pedal is depressed beyond a predetermined position, which is quite close to its rest position, the transistor 3T1 is off, and so the transistors 3T2, 3T3 and 3T4 are off, off and on respectively. While the transistor 3T4 is conducting, it turns on the transistor 3T15 which holds the transistor 3T18 off, which means that the terminal $f$ can never become negative, which in turn means that the thyristor SCR1 cannot be fired. Referring to FIG. 6, as long as no input is received at the terminal $h$, the uni-junction transistor 6T8 and its associated components produce pulses which are fed to the transformer 6TT5 independently of the one shot blocking oscillator, so that firing pulses are applied to the thyristor SCR2. As long as the accelerator pedal is not pressed beyond a predetermined position, the thyristor SCR2 will continue to receive firing pulses, so keeping the capacitor C1 in FIG. 1 charged.

This could happen for example if the vehicle is at rest and the circuit is not switched off. However, as soon as the accelerator pedal is depressed beyond its predetermined position, then the transistor 3T1 turns on, the transistor 3T15 turns off, and the transistors 3T17 and 3T18 continue to operate as previously described. In these circumstances, the uni-junction transistor oscillator has no effect, because the capacitor 6C4 is discharged by way of the transistor 6T7 before it ever reaches a voltage at which it turns on the uni-junction transistor 6T8.

It will be recalled that the purpose of the cycling oscillator 29 in the block diagram is to simulate the effect of the upper current requirement having been reached, even if it has not been reached, after a predetermined period of time. When the armature current is rising, the transistor 4T7 is off, and the transistor 3T14 in FIG. 3 has its base and emitter at the same potential, the base connection of the transistor 3T14 being taken by way of the terminal E. Since transistor 3T14 is off, the capacitor C6 can charge, but in normal operation the transistor 4T8 will turn on again before the capacitor 3C6 is fully charged, and will cause the transistor 3T14 to conduct to discharge the capacitor 3C6. However, if the upper level is not attained, then when the capacitor 3C6 is fully charged, current will flow by way of the diode 3D9 to turn on the transistor 3T17, so simulating the effect of switching of the bi-stable circuit 53.

The signal fed between the parts of the circuit shown in FIGS. 4 and 3 by way of the terminal e also operates the frequency to voltage converter 32. As the transistor 4T8 turns on and off, an alternating signal is fed by way of the terminals E in FIGS. 4 and 3 to a diode pump circuit incorporating a capacitor 3C7, the transistors 3T12 and 3T13 and the capacitor 3C5. If the frequency rises above a predetermined value, the diode pump circuit turns on the transistor 3T10, which provides an input to the bi-stable circuit 54. The effect of this is to reduce the lower level set by the bi-stable circuit 54, so that the frequency is reduced.

The above description assumes a constant field current, but as explained previously, there will come a moment at which direct control of the armature current using the circuit shown in FIG. 1 is no longer possible, so that it is then necessary to reduce the field current in order to effect further increase in armature current. Referring now to FIG. 5, and ignoring for the moment the fact that the "fixed" field current can in fact be varied in accordance with the accelerator position, the arrangement is that a current flows through the resistor 5R17 to the comparator 43, this current representing the fixed value of field current which has been set. The comparator 43 also receives a signal from the line 51, and a signal from the combined amplifier and inverter 41, 42, the input from which is taken from terminal I and represents the actual field current. Thus, the comparator 43 receives one input signal representing the demanded field current, and another input signal representing the actual field current, and acts through the transistor 5T5 to vary the mark of the mark-space oscillator constituted by the transistors 5T6 to 5T9 and their associated components. The space in this oscillator is fixed. The output from the oscillator operates by way of the transistor 5T10 and the transistors 5T11, 5T12, 5T13 to keep the mean current flow in the field winding 65 constant, assuming that the inputs to the comparator 43 are the same.

Reverting now to FIG. 4, the integrating amplifier 47 receives a signal from the armature by way of the coaxial cable 61, 62 and produces an output representing armature current. This output is fed by way of the terminal g in FIG. 4 to the comparator 46 in FIG. 5. The comparator 46 also receives an input by way of the terminal c in FIG. 5 from the transistor 3T8 in FIG. 3, and it will be recalled that the transistor 3T8 conducts a current which is set by the function generator. Thus, the comparator 46 compares the actual armature current with the demanded armature current, and when the transistor 5T3 is off plays no part in the circuit. However, if at any time the actual armature current falls below the demanded armature current, the comparator 46 produces an output which turns on the transistor 5T3, which then decreases the signal to the comparator 43 through the resistor 5R17, so that the field current is reduced automatically to a level at which the circuit shown in FIG. 1 can increase the armature current directly in the manner demanded by the function generator 17.

As previously explained, under light throttle conditions, it is wasteful to have the full current flowing in the field winding. The potentiometer 64 merely adjusts the demanded field current under light throttle conditions, so that it assumes a lower level. It is not envisaged that the lowering of field current will take place at anything more than about 50 percent of full throttle setting.

In some cases, it may be advantageous to incorporate a series field winding as well as the shunt windings, so that the motor is a compound motor. However, although such an alteration alters the motor characteristics, it does not have any effect on the overall control system described.

It will be appreciated that the field current is a function of the mark-space ratio of the oscillator comprising the transistors 5T6 to 5T9. The mark time is controlled by the rate of charge of the capacitor 5C4, which is a linear function of the collector current of the transistor 5T6. The collector current is in turn controlled by the base voltage of the transistor 5T6, and this base voltage is a function of the output voltage of the comparator 43. If the field current is too large, the output of the comparator 43 falls, reducing the current in the transistor, 5T6 causing the capacitor 5C4 to take longer to recharge. This corresponds to a longer off-time for the transistors 5T12 and 5T13 which results in a lowering of the field current.

If the armature current falls below its required value the output of the comparator 46 falls, causing the transistor 5T3 to turn on. This causes the voltage across the resistors 5R10 and 5R11 to increase and reduces the current in the resistor 5R17. This cuases the output of the comparator 43 to fall, so that the capacitor 5C4 takes longer to recharge, which again causes a reduction in field current. This results in reduction of the back e.m.f., and a consequent increase in armature current. In this way the field current controls the armature current.

The demanded field current is a function of the voltage on the emitter of the transistor 5T4, which in turn follows the voltage on the emitter of the transistor 5T2 as a result of the potential divider action of the resistors 5R8, 5R9 and 5R35. At low accelerator pedal depression the slider of the potentiometer 64 is at the potential of the line 52 and the transistor 5T1 is off. In this condition the voltage on the emitter of the transistor 5T2 is set by the diode chain 5D2 to 5D5. This corresponds to minimum field current. As the accelerator is depressed and more armature current is demanded, the potential of the slider moves towards the potential of the line 51, causing the transistor 5T1 to turn on and moving the emitter potential of the transistor 5T2 towards the potential of the line 52. This corresponds to an increased demand for field current proportional to the increased demand of armature current, it being understood that the sliders and resistors 3R14 in FIG. 3, and the unit 64 in FIG. 5, are coupled to the accelerator pedal so that they move equally as the accelerator is depressed. At some later point defined by the breakdown of the diode 5D2, the emitter of the transistor 5T2 becomes fixed at a voltage corresponding to maximum field current, irrespective of a further increase demand from the accelerator pedal.

The reason for the relatively complex firing circuits for the thyristors is that single pulse firing is preferred because of the need to conserve power consumption in the gate firing circuit. Moreover, if the thyristor fails to fire when it receives a single pulse, it is unlikely to fire at all. Firing using direct current is not possible because of the need to isolate the cathodes of the thyristors from one another.

The pulse to the gate is a high current fast rise time pulse which is best generated in a transformer separate from the blocking oscillator, which then controls the actual width of the pulse. In order to obtain a fast rise time the toroids in the transformers 6TT2 and 6TT4 and 6TT6 are used, and these require re-set windings, hence the relative complexity of the system. Typical pulses are 20 micro-seconds wide, 20 volts and rising in 1 micro-second to 2 amps.

We claim:

1. A vehicle traction system for a vehicle having an accelerator pedal comprising an electric drive motor for the vehicle, a control system for the drive motor, said control system comprising a function generator for effecting direct variation of the motor armature current, the function generator receiving input signals representing the position of the accelerator pedal and the engine speed, said function generator comprising means dependent on said input signals for establishing a preselected output current range of minimum and maximum allowable armature currents and for maintaining said range the same as the position of the accelerator pedal is changed to vary the speed of the vehicle.

2. A system as claimed in claim 1, wherein said electric drive motor has a shunt field winding and wherein a field current control circuit is provided for maintaining current flow in said field winding, said system further including field control means operable automatically when back EMF developed in the armature prevents the increase of armature current to the level set by said function generator for over-riding said field current control circuit and lowering the field current.

3. A system as claimed in claim 2 in which the armature current control circuit comprises a thyristor power controller having a thyristor connected in series with the armature and commutating means for turning said thyristor off, and a firing circuit controlled by the function generator and supplying signals to the controller to turn the thyristor on and off.

4. A system as claimed in claim 3 in which the function generator sets upper and lower armature current levels at which the thyristor is turned off and on respectively.

5. A system as claimed in claim 4 including means for ensuring that the thyristor is on for a minimum period of time sufficient to ensure satisfactory operation of the power controller.

6. A system as claimed in claim 4 including means for ensuring that the thyristor is off for a minimum period of time sufficient to ensure satisfactory operation of the power controller.

7. A system as claimed in claim 4 including means for turning said thyristor off after a predetermined period of time if said upper current level has not been attained.

8. A system as claimed in claim 4 including means restricting the maximum switching frequency of the power controller.

9. A system as claimed in claim 4 including means operable when the system is switched on for ensuring that before the thyristor is turned on, the commutating means is in a condition to turn the thyristor off again.

10. A system as claimed in claim 2 including a comparator coupled to the function generator and armature so as to receive signals representing the desired armature current and the actual armature current, said comparator forming part of the field control means and serving when the desired armature current exceeds the actual armature current to lower the field current.

11. A system as claimed in claim 10 in which the field current control circuit includes in addition to the first mentioned comparator a second comparator which compares the actual field current with a desired field current and acts to maintain the field current at the desired level, the output from the first mentioned comparator being coupled to the second comparator to vary the desired field current.

12. A system as claimed in claim 11 in which the desired field current is, in the absence of any signal from the first comparator, constant.

13. A system as claimed in claim 11 in which the desired field current is, in the absence of any signal from the first comparator, varied in a predetermined manner.

14. A system as claimed in claim 13 in which the desired field current is, in the absence of any signal from the first comparator, constant except for light throttle pedal settings, when the desired field current is reduced.

15. A system as claimed in claim 2 in which said function generator serves, assuming the accelerator pedal to be completely depressed, to maintain constant armature current until a first vehicle speed is reached, and then decrease the armature current until a second vehicle speed is reached, then to maintain the armature current at the lower value until a third vehicle speed is reached, and finally, to decrease the armature current again.

16. A system as claimed in claim 2 in which the motor also incorporates a series field winding.

* * * * *